Aug. 24, 1926.
J. J. CURRAN
TIRE CARRIER
Filed Sept. 16, 1924
1,597,062
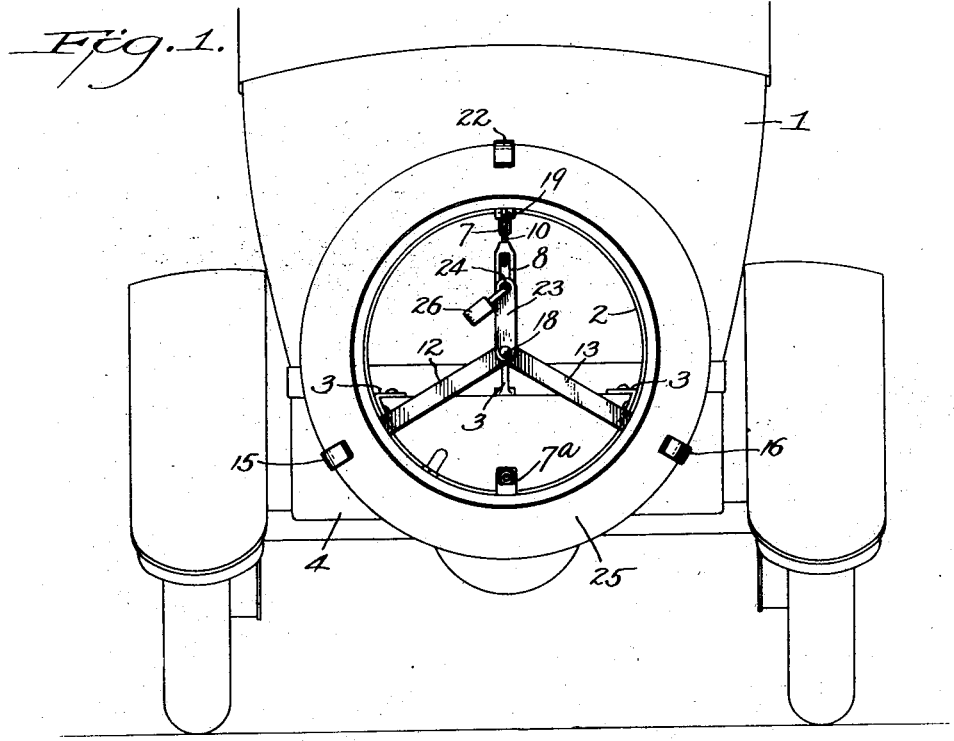
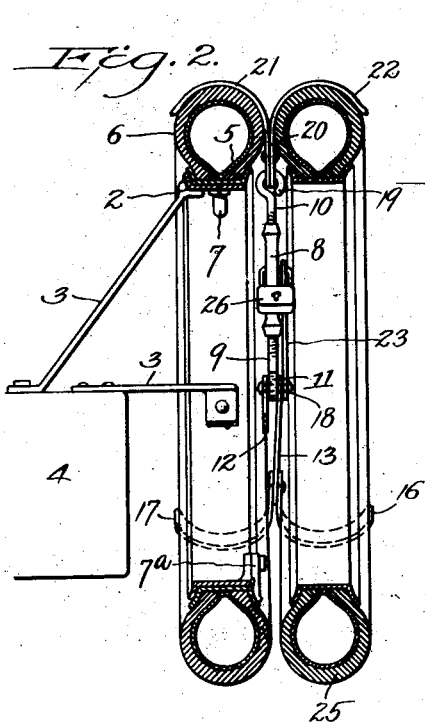
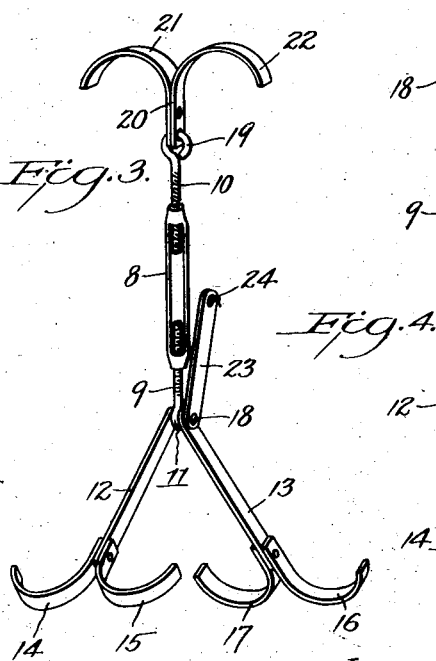
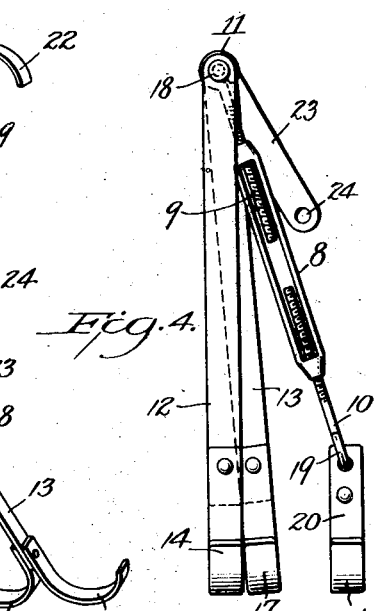
INVENTOR
JOHN J. CURRAN
BY
ATTORNEY Patented Aug. 24, 1926.

1,597,062

UNITED STATES PATENT OFFICE.

JOHN J. CURRAN, OF NEW YORK, N. Y., ASSIGNOR TO WALTER R. GREEN, OF CHICAGO, ILLINOIS.

TIRE CARRIER.

Application filed September 16, 1924. Serial No. 737,967.

This invention relates to tire carriers, and my improvements are particularly directed to a form of carrier which is characterized by the following features and advantages:

It is provided with locking means of novel character to prevent its unwarranted removal, or removal of the tire it carries.

Other features and advantages of my invention will hereinafter appear.

In the drawing:—

Figure 1 is a rear view of a motor vehicle showing my improved carrier, with a spare tire thereon, as removably mounted on a spare tire that is carried by the usual fixed carrier.

Fig. 2 is a section on the line 2—2 of Fig. 1.

Fig. 3 is a perspective view, extended, of my improved carrier, and

Fig. 4 is an enlarged view of said carrier collapsed for storage.

In the example of my invention herein illustrated let 1 indicate a motor vehicle and 2 a fixed carrier which is connected as by braces 3 to the fuel tank 4. According to usual practice the rim 5 of spare tire 6 is seated in carrier 2, the rim 5 having a hole to receive the valve stem 7, and a pivotal lug 7ª coacting therewith to lock the spare tire on said carrier. When making extended trips, or touring it is advisable to carry one or more extra spare tires, and the purpose of my invention is to provide means whereby another tire, either with or without a rim, can be hooked upon the spare that is held by the fixed carrier, the means which I employ comprising a collapsible carrier, foldable into small compass to be placed in the tool box when not in use, but capable of being extended to engage a carried spare, and to itself carry an additional spare.

The organism of said collapsible carrier includes a turnbuckle having a slotted sleeve member 8 with its opposite ends respectively engaged by oppositely threaded rods 9, 10.

The outer end of rod 9 is provided with an eye 11, and arms 12, 13, respectively terminating in oppositely extended pairs of hooks 14, 15, and 16, 17, are freely engaged with said eye as by a pivot 18.

The outer end of rod 10 terminates in a hook 19, which freely engages through a hole provided in the united shanks 20 of a pair of oppositely extended hooks 21, 22.

An arm 23, also mounted at one end on pivot 18, is adapted to be swung into parallelism with the turnbuckle, and is provided with a hole 24 at its free end, so that the keeper of a lock such as shown at 26, may be passed through said hole and the slot in the turnbuckle sleeve, to secure the device in its extended position.

In putting my improved collapsible carrier into service the hooks 14, 17 and 21 are placed upon the tread of the carried spare 6, and then an extra spare tire, as 25, is fitted between the hooks 15, 16 and 22. Suitable adjustment is effected by manipulation of the turnbuckle to expand and contract the device.

The hooks 21, 22 being freely movable by means of the pivotal engagement had by their shanks 20 with the hook 19, can be swung or canted over when desirable to accommodate a tire which slightly exceeds in diameter the diameter of the tire 6 which serves as the support for my improved carrier.

Such variation in diameter may exist when one tire is worn and the other new, or it may be that one is a complete tire upon a rim and the other a shoe only.

It will also be appreciated that by means of additional carriers a succession of spares may be hooked one upon another.

Variations within the spirit and scope of my invention are equally comprehended by the foregoing disclosure.

I claim:—

In a collapsible tire carrier, in combination, a turnbuckle including a slotted sleeve having opposed rods threaded through opposite ends thereof, a pair of arms in pivotal engagement with one of said rods at its free end, said arms each terminating in a pair of oppositely extended hooks, the other rod having a terminal hook, a pair of oppositely extended hooks whose shanks are united and in pivotal engagement with said terminal hook, and an additional arm pivoted about the same axis as said pair of arms, said additional arm having means of locking engagement with the slotted sleeve when swung into parallelism therewith.

Executed this 9th day of September, 1924.

JOHN J. CURRAN.